Aug. 20, 1935.   R. V. DERRAH   2,011,755

REACTION TORQUE TRANSMISSION DEVICE

Filed Feb. 6, 1934   4 Sheets-Sheet 1

INVENTOR
ROBERT V. DERRAH
BY James M. Abbett
ATTORNEY

Aug. 20, 1935.  R. V. DERRAH  2,011,755
REACTION TORQUE TRANSMISSION DEVICE
Filed Feb. 6, 1934  4 Sheets-Sheet 2

INVENTOR
ROBERT V. DERRAH
BY James M. Abbett
ATTORNEY

Aug. 20, 1935.    R. V. DERRAH    2,011,755
REACTION TORQUE TRANSMISSION DEVICE
Filed Feb. 6, 1934    4 Sheets-Sheet 3

INVENTOR
ROBERT V. DERRAH
BY James M. Abbett
ATTORNEY

Aug. 20, 1935.  R. V. DERRAH  2,011,755

REACTION TORQUE TRANSMISSION DEVICE

Filed Feb. 6, 1934  4 Sheets—Sheet 4

INVENTOR
ROBERT V. DERRAH
BY James M. Abbett
ATTORNEY

Patented Aug. 20, 1935

2,011,755

UNITED STATES PATENT OFFICE 2,011,755

REACTION TORQUE TRANSMISSION DEVICE

Robert V. Derrah, Beverly Hills, Calif.

Application February 6, 1934, Serial No. 709,961

27 Claims. (Cl. 74—259)

The purpose of my invention is to provide a torque transmission device whereby a prime mover may be connected to a load and whereby rotational motion of the prime mover shaft produces a tendency to rotate the load shaft, which tendency increases as the speed of rotation of the prime mover shaft increases with respect to the load shaft. A further purpose of my invention is to obtain the above characteristics by means of rotary masses alternately transferring kinetic energy from one to the other through reaction on a fulcrum point eccentric to the load shaft axis, which reaction produces a rotational tendency or torque on said load shaft. A further purpose of my invention is to provide means whereby the direction of the force reactions on said fulcrum point reverses at approximately the same instant at which the energy transfer between masses is zero, whereby a unidirectional reaction is produced on said fulcrum point tending to turn the latter about said load shaft unidirectionally.

Figure 1:
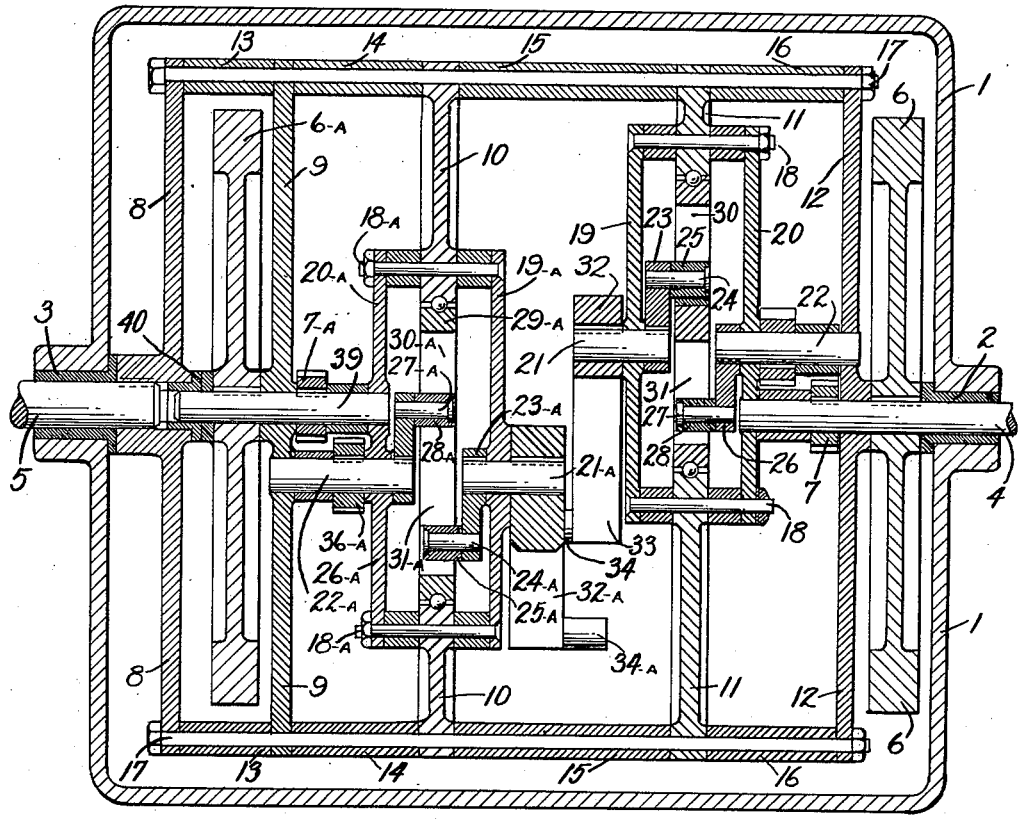
Figure 3:
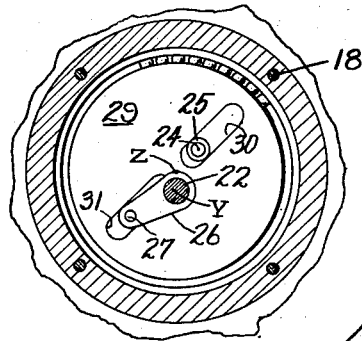
Figure 2:
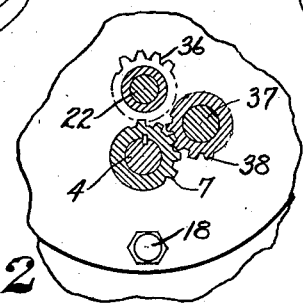
Figure 4:
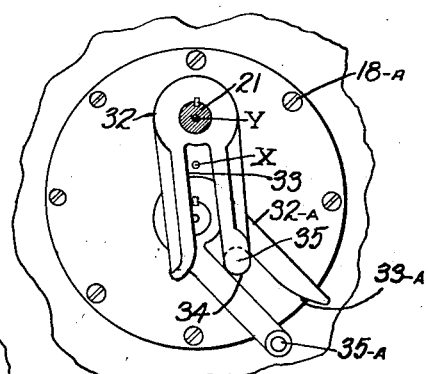
Figure 5:
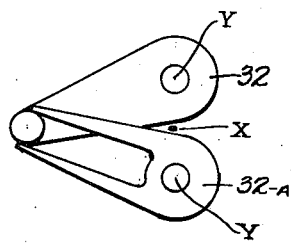
Figure 6:
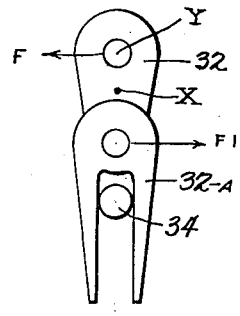
Figure 7:
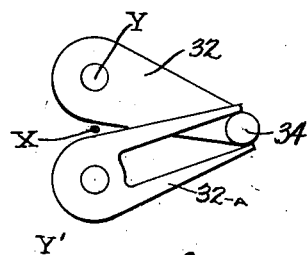
Figure 12:
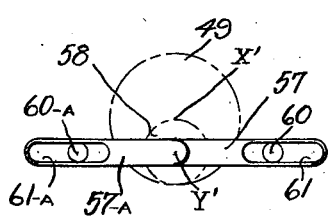
Figure 13:
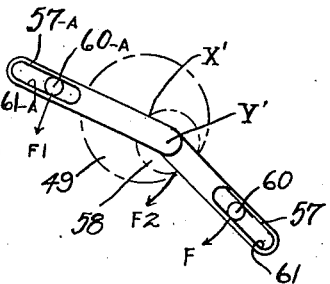
Figure 14:
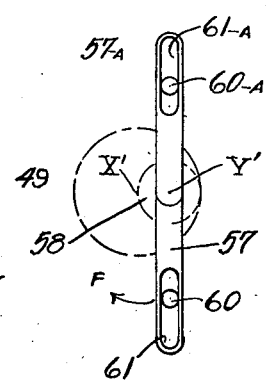
Figure 19:
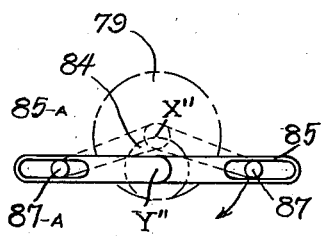
Figure 20:
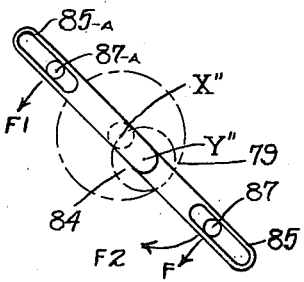
Figure 21:
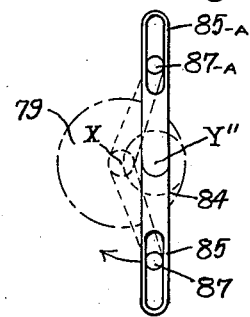
Figure 8:
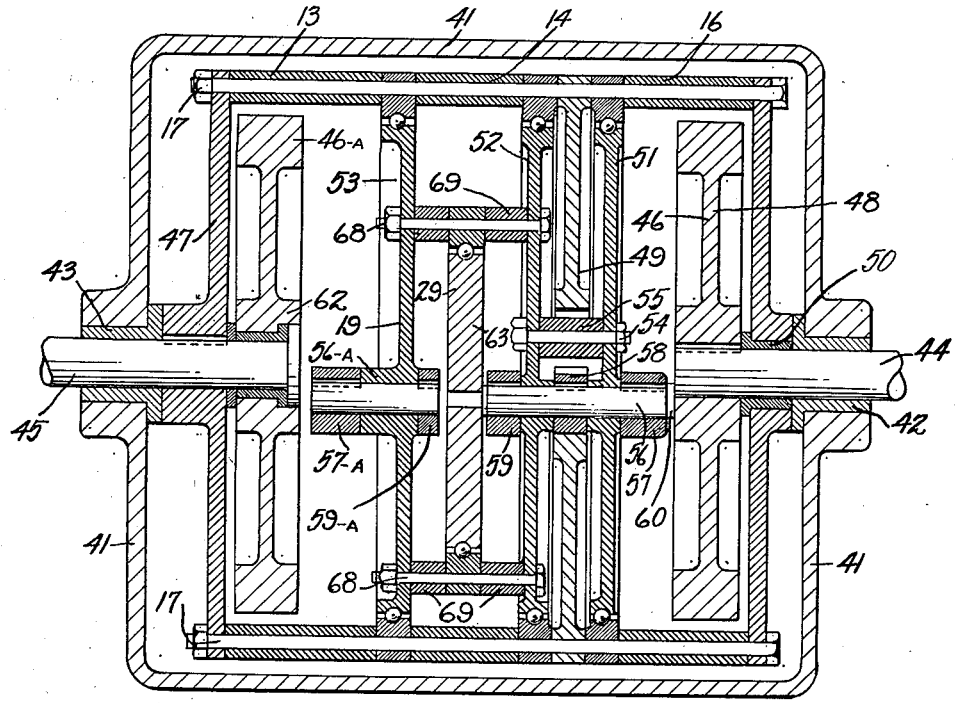
Figure 11:
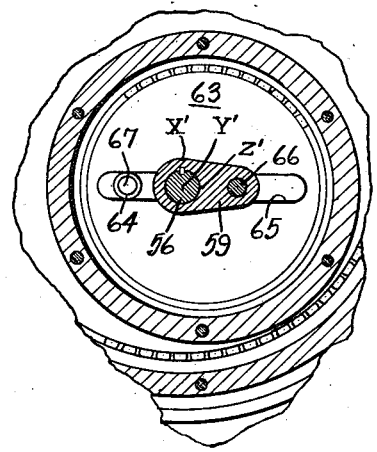
Figure 9:
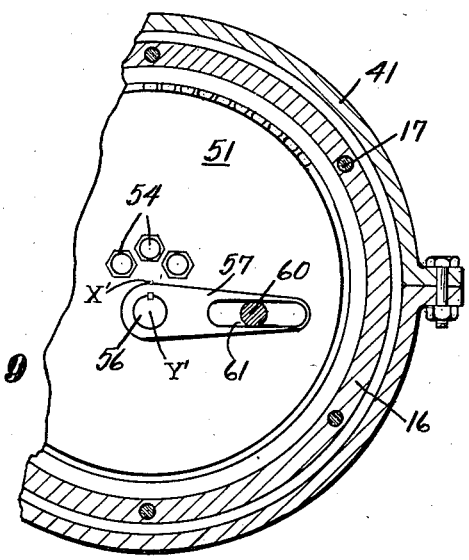
Figure 10:
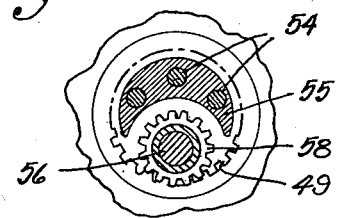
Figure 15:
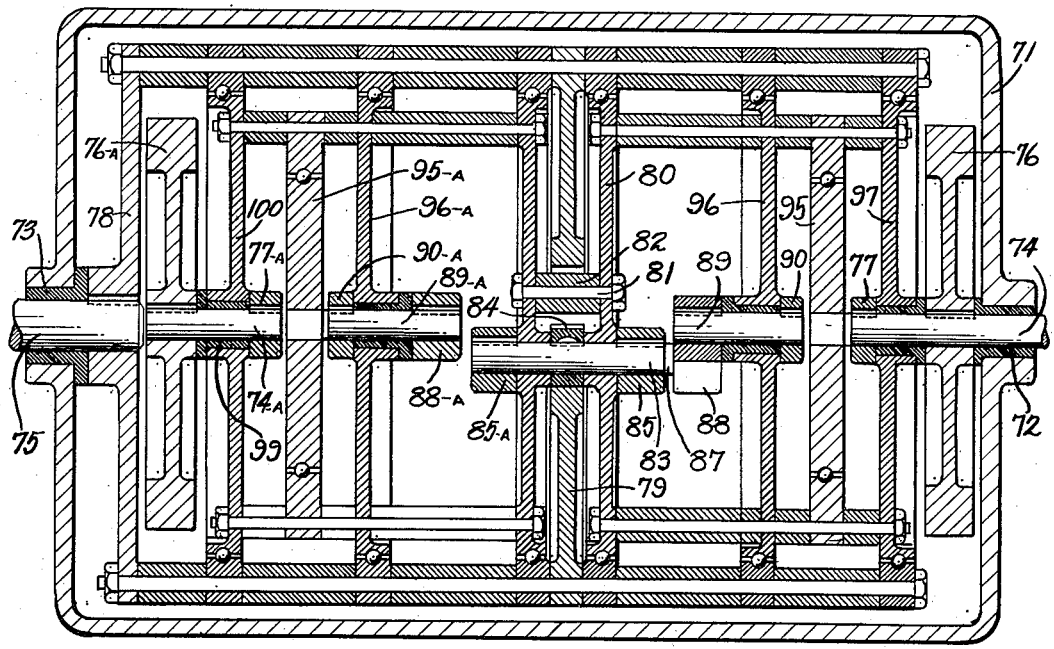
Figure 16:
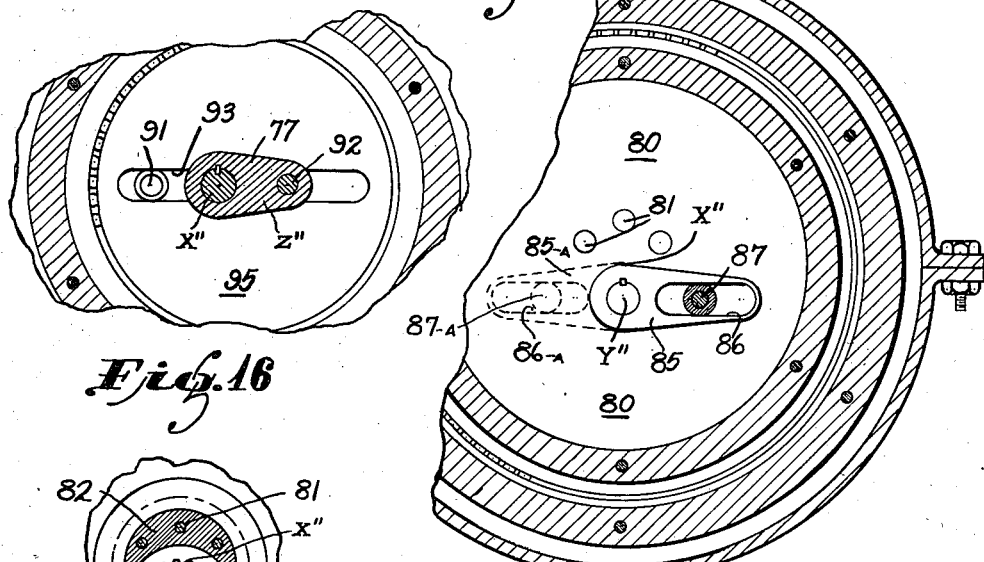
Figure 18:
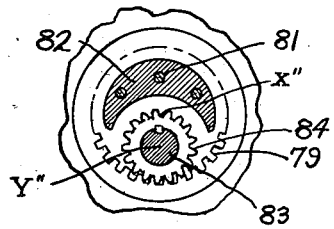
Figure 17:
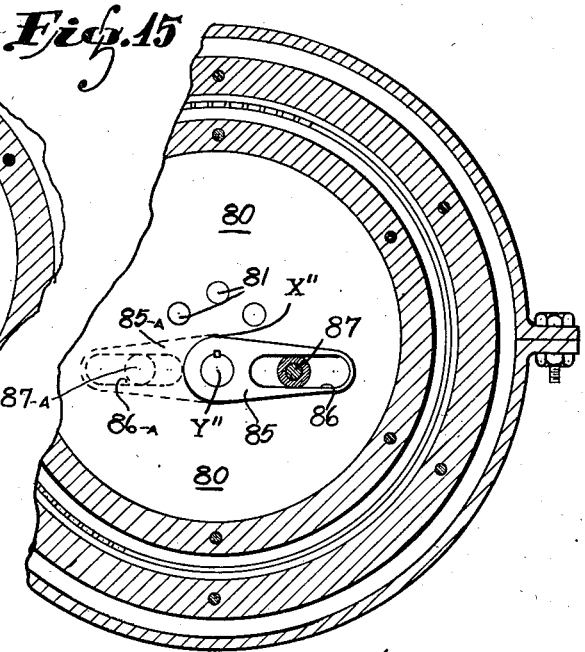

These objects are accomplished by means of the embodiments of my invention illustrated in the accompanying drawings, in which:

Figs. 1 to 7 inclusive apply to one form of my invention; Figs. 8 to 14 inclusive apply to another form of my invention; Figs. 15 to 21 inclusive apply to still another form of my invention; Fig. 1 is a longitudinal section view through a transmission; Figs. 2, 3 and 4 are fragmentary transverse sectional views as seen on the planes indicated by the corresponding numbers in Fig. 1; Figs. 5, 6 and 7 are diagrammatic views illustrating the principles of the form of my invention shown in Figs. 1 to 4 inclusive; Fig. 8 is a longitudinal sectional view of another form of my invention; Fig. 9 is a sectional view as seen on the plane indicated by 9—9 in Fig. 8; a view as seen on the plane indicated by 9—A—9—A would be like Fig. 9 except for the reference numbers applied to like parts which bear the added suffix A; Figs. 10 and 11 are fragmentary transverse sectional views as seen on the planes indicated by the corresponding numbers in Fig. 8; Figs. 12, 13 and 14 are diagrammatic views illustrating the principles of my invention as embodied in Figs. 8 to 11 inclusive; Fig. 15 is a longitudinal sectional view of another form of my invention; Fig. 16 is a fragmentary transverse sectional view as seen on the plane indicated by 16—16 in Fig. 15; a transverse section taken on the plane 16—A—16—A would be like Fig. 16 with corresponding parts indicated by like numbers with the suffix A added, Fig. 17 is a transverse sectional view as seen on the plane indicated by 17—17 in Fig. 15; a transverse section taken on the plane 17—A—17—A would be like Fig. 17 with reference numerals applied to like parts having the suffix A added; Fig. 18 is a fragmentary transverse sectional view as seen on the plane indicated by 18—18 in Fig. 15; and Figs. 19, 20 and 21 are diagrammatic views illustrating the pinciples of the embodiment of my invention shown in Figs. 15 to 18 inclusive.

Referring to Figs. 1 to 7 inclusive of the drawings, one form of mechanism is illustrated. A housing 1 mounts coaxial bushings 2 and 3. In bushing 2 turns a driving shaft 4 adapted to be connected to a prime mover, and in bushing 3 turns a driven shaft 5 adapted to be connected to the load. Keyed to driving shaft 4 is a flywheel 6 and a pinion gear 7. Keyed to driven shaft 5 is a driven cage comprising disks 8, 9, 10, 11 and 12 separated by spacing rings 13, 14, 15 and 16 and all held together by bolts 17. This case is supported and turns freely upon shaft 4 in a bearing in disk 12 concentric with shaft 5. The driving shaft 4 and the driven shaft 5 are concentric and the common axis is designated as X in Figs. 4 to 7.

Rigidly attached by bolts, 18 to disk 11 are plates 19 and 20, which have coaxial bearings journaling coaxial shafts 21 and 22. Keyed to shaft 21 is an arm 23 carrying a trunnion 24 on which a roller 25 is freely journaled so as to form a part of the trunnion. Keyed to shaft 22 is an arm 26 carrying a trunnion 27 on which a roller 28 is freely journaled to form a part of the trunnion. Shafts 21 and 22 turn about an axis designated as Y in Figs. 3 to 7 and eccentric to axis X. Between disks 19 and 20 is mounted a cam disk 29 containing slots 30 and 31, in which rollers 25 and 28 travel respectively. Cam disk 29 is supported in disk 11 by ball bearings and rotates about an axis Z eccentric to Y as shown in Fig. 3.

The mechanism comprising disks 19 and 20, shafts 21 and 22, arms 23 and 26, trunnions 24 and 27, rollers 25 and 28 and cam disk 29, I shall hereinafter term an "accelerator", as the function of this mechanism is to alternately accelerate and decelerate shaft 21 with respect to shaft 22.

Keyed to shaft 21 is an arm 32 containing a cam slot 33 and mounting a roller 34 turning on its trunnion 35, which cam slot and roller are so designed as to mesh with a similar slot and roller designated as slot 33—A and roller 34—A mounted on trunnion 35—A carried by arm 32—A keyed to shaft 21—A. Shaft 22 turning in its bearing in disk 20 is keyed to pinion gear 36. Shaft 22 also turns in a bearing in disk 12.

Mounted on bearings in disks 12 and 20 is an idler shaft 37 shown in Fig. 2 carrying idler gear 38. Gear 38 meshes with pinion 36 and with pinion 7 and serves to cause both of the latter to turn in the same direction.

Disk 10 mounts an "accelerator" similar to that above described as mounted by disk 11, with parts numbered similarly except with the suffix "A". Shaft 39 is located similarly to and coaxial with shaft 4 having a pinion 7—A and flywheel 6—A keyed to it, and one end of shaft 39 turns freely in bushing 40 coaxial with shaft 5. The two accelerators are mounted 180 degrees apart about the main axis X, and the shafts 21 and 21—A are equidistant from X.

Referring to Figs. 5, 6 and 7, X is the axis of rotation of the main shafts 4 and 5. Y and Y—1 are the axes of the arms 32 and 32—A and tend to rotate about X. Assume that the accelerators are omitted and that flywheel 6 is keyed to shaft 21 so as to be mounted on axis Y, and secured directly to arm 32. Also assume that flywheel 6—A is keyed to shaft 21—A so as to be mounted on axis Y—1 and attached directly to arm 32—A. Fig. 5 illustrates the start of a phase. During the phase shown by the diagrams Figs. 5 to 7, assume that the angular velocity of arm 32 and flywheel 6 is caused to decrease from maximum to minimum, and the angular velocity of arm 32—A and flywheel 6—A is caused to increase from minimum to maximum. During this phase, therefore, it may be said that 32 is driving 32—A. Fig. 6 shows the position of the arms at the middle portion of the phase. Obviously arm 32 tends to fulcrum about the roller 34, and exerts a pressure on the axis Y in a left hand direction as indicated by the arrow F in Fig. 6. Also arm 32—A resisting acceleration tends to fulcrum about roller 34, and exerts a pressure on the axis Y—1 in a right hand direction as indicated by F—1 in Fig. 6. But X is the main axis of rotation, hence the pressures on Y and Y—1 both act to produce a counter-clockwise rotation of these axes about X, which pressures are transmitted to the cage and cause the latter to tend to turn the driven shaft 5. Fig. 7 shows the end of the phase. During the following phase, (not shown) roller 34—A (not shown in diagram) enters slot 33, (not shown in diagram) and the energy transfer is from 6—A to 6, or from 32—A to 32, during which the reactions on Y and Y—1 are still in the same rotating directions and produce a counter-clockwise turning effort about X.

It will be seen that, were it not for the accelerators, arm 32—A would have its maximum velocity at the position shown in Fig. 6, and from that position on the pressure on the axes Y and Y—1 would be reversed, and would produce a clockwise effort about X. The function of the accelerators, therefore, is to compensate for this characteristic in the cam and slot or any other such mechanism similar to that illustrated by the diagrams, and to cause the maximum and minimum velocity positions to occur as indicated by Figs. 5 and 7, instead of at such a position as indicated by Fig. 6.

The operation of the accelerator is seen from Fig. 3. Assuming counterclockwise rotation with arm 26 driving, the minimum angular velocity of the disk 29 will occur when the roller on trunnion 27 gets to bottom position, or furthest from the axis Z. Likewise, at this instant trunnion 24 is closest to axis Z. Therefore, the velocity of trunnion 24 and shaft 21 will be minimum with respect to the disk 29 and therefore a minimum with respect to the shaft 22. During the following half revolution the process is reversed and shaft 22 accelerates shaft 21. By relating the axes Y and Z at the proper angle with respect to arms 32 and 32—A, it will be seen that either the maximum or minimum velocity, called the "cut-off" position, as respecting the two flywheels may be made to come at the positions indicated at Figs. 5 and 7, regardless of the fact that at the position of arm 32—A shown in Fig. 6, arm 32—A has its maximum velocity with respect to arm 32.

I do not wish to limit my invention to using the particular form of accelerator here indicated, as numerous well known mechanical devices will cause two parallel shafts to alternately accelerate and decelerate each other, such as an elliptical gear train, a drag link mechanism, a sliding bar linkage, etc. Nor do I wish to limit my invention to that indicated as far as flywheel locations are concerned, for, if pinions 7 and 36 are of the same size, and if pinions 7—A and 36—A are of the same size, the action of the flywheels is just the same as though they were mounted directly on shafts 22 and 22—A. Therefore, flywheel 6 could be mounted and keyed direct on shaft 22, and flywheel 6—A could be mounted on and keyed direct to shaft 22—A, thus eliminating pinions 7—A, 36—A and 38—A. Furthermore, pinions 7, 36, and 38 could be eliminated by connecting shaft 22 to driving shaft 4 by a shaft and two universal joints, all without departing from the principle and operation of this device.

Referring to Figs. 8 to 14 inclusive, another form of my invention is shown. A housing 41 mounts coaxial bushings 42 and 43. Bushing 42 carries a driving shaft 44 and bushing 43 carries a driven shaft 45. Keyed to driving shaft 44 is flywheel 46, and keyed to driven shaft 45 is a cage comprising disks 47 and 48, ball races, and an annular gear 49, spaced apart by spacer rings and held together by bolts. The cage is supported and turns freely on shaft 44 in bushing 50 held in disk 48. Annular gear 49 is concentric with shafts 44 and 45 so as to have a common axis designated as X' in Figs. 9 to 14 inclusive.

Disks 51, 52 and 53 turn coaxial with X' in ball bearings mounted in the ball races in the cage. Disks 51 and 52 are bolted together by bolts 54 and are spaced apart by a spacer 55. In bearings in disks 51 and 52 turns a shaft 56 on which are keyed arm 57, planet gear 58 and arm 59. Planet gear 58 meshes with annular gear 49.

Flywheel 46 carries a trunnion 60 having a roller working in a cam slot 61 in arm 57. A flywheel 46—A floats freely on shaft 45 in a bushing 62 and carries a trunnion 60—A having a roller working in a cam slot 61—A in arm 57—A keyed to shaft 56—A, which roller and arm are positioned approximately 180 degrees from arm 57 and roller 60.

This form of my invention has one accelerator comprising arms 59 and 59—A, carrying trunnions 66 and 67. A cam disk 63 mounted on ball bearings turns in a ball race and contains cam slots 64 and 65 in which rollers on trunnions 66 and 67 work. Disk 63 rotates about an axis hereinafter called Z', which is eccentric to the axis Y' of shafts 56 and 56—A. Plates 52 and 53 are bolted together by bolts 68 and are spaced apart by spacer 69. The plates 51, 52 and 53 are secured together to form a floating carriage.

Referring to Figs. 12, 13 and 14 showing diagrammatic illustrations of the operation of my invention, trunnions 60 and 60—A revolve about the axis X' and are each mounted on a flywheel. Arm 57 is attached to the planet gear 58 at axis Y'. Clockwise rotation of roller 60 about axis X' causes planet gear 58 to revolve in a clockwise direction about its own axis Y' and causes axis Y' to revolve counterclockwise about axis X'. Fig. 12 shows the starting point of one phase, at which point 60 has a maximum velocity and arm 60—A has a minimum velocity. Between the positions shown in Figs. 12 and 14, roller 60 is reduced from maximum to minimum velocity. Between these two positions the point of contact between the planet and annular gear acts as a fulcrum point and the reaction on said contact point tends to rotate the annular gear 49 in a clockwise direction. At the position shown in Fig. 14, roller 60—A has reached its maximum velocity and during the ensuing phase of the cycle (not indicated) 60—A decreases in velocity and imparts an increased velocity to 60 and to flywheel 46 attached thereto. Thus, there occurs an alternate transfer of kinetic energy from flywheel 46 to flywheel 46—A and vice versa, and the reaction at the point of contact between the planet and annular gears is always in the same rotary direction with respect to the main axis X'.

It is obvious that if arms 57 and 57—A were one solid arm, the maximum velocity of roller 60—A with respect to roller 60 would occur when roller 60 was closest to the point of tooth contact or instantaneous center of the planet and annular gears, that is, in some such position as indicated by Fig. 13. From this position onward, therefore, roller 60—A would accelerate roller 60 and the reaction on the fulcrum point of contact would be in a right hand direction and produce a counterclockwise turning effort on the annular gear 49. However by interconnecting the accelerator between arms 57 and 57—A, the maximum minimum velocity or zero acceleration positions are made to occur at positions shown in Figs. 12 and 14, thereby preventing a reversal of the reaction on the driven annular gear.

Referring to Figs. 15 to 21 inclusive another form of my invention is illustrated, in which a housing 71 is shown mounting coaxial bushings 72 and 73. In bushing 72 a driving shaft 74 turns. In bushing 73 a driven shaft 75 turns. Keyed to shaft 74 is flywheel 76 and an arm 77 of the first accelerator. Keyed to driven shaft 75 is disk 78, which is part of a cage comprising ball bearing races and an annular gear 79, all of which are held together by bolts and spaced apart by spacers. Disks 80 and 80—A of the cage revolve coaxial with shafts 74 and 75 turning on ball bearings in ball races in the cage. Disks 80 and 80—A are held together by bolts 81 and spaced apart by a spacer 82 and also journal a shaft 83 having keyed thereto a planet gear 84 maintaining the latter in mesh with annular gear 79. Shaft 83 is also keyed to an arm 85—A. Arm 85 has a cam slot 86 in which travels the roller of a trunnion, 87. Trunnion 87 is mounted on a trunnion on arm 88, which arm is keyed to shaft 89. Also keyed to shaft 89 is an arm 90, on which is mounted a trunnion 91 having a cam roller. Shaft 74 is keyed to arm 77 on which is mounted a trunnion 92 having a roller. The rollers on trunnions 91 and 92 work in cam slots 93 and 94 respectively of disk 95, which disk is carried by ball bearings running in ball races. The axis of rotation of disk 95 is indicated by Z'' in Fig. 16.

Arm 85—A has a slot 86—A in which travels a roller 87—A, the latter being mounted on a trunnion on arm 88—A, which is keyed to a shaft 89—A. An arm 90—A is keyed to shaft 89—A, on which is mounted a trunnion 92—A having a cam roller operating in a slot 94—A in disk 95—A. An arm 77—A is keyed to a shaft 74—A coaxial with shafts 74 and 75. Arm 77—A has a trunnion 91—A operating in slot 93—A. Shaft 74—A turns in a bushing 99 mounted in disk 100, the latter turning in a ball race in the cage. Keyed to a shaft 74—A is the flywheel 76—A.

Disks 97, 96, 80, 80—A, 96—A and 100 are secured together and form a floating carriage.

The mechanism comprising disks 97 and 96, arms 90 and 77, trunnions 91 and 92, with rollers, disk 95 and cam slots 93 and 94 makes up the first accelerator. The second accelerator consisting of parts similarly numbered but with the suffix "A" is similar, and shaft 74—A is keyed to flywheel 76—A. Arms 85 and 85—A are set 180 degress apart.

Referring to Figs. 19, 20 and 21, the diagrams show one phase of the operation of this device during which roller 87 imparts velocity and kinetic energy to roller 87—A. Figs. 19 and 21 represent the positions of maximum and minimum velocity of arm 87 respectively. Fig. 20 represents the parts of the mechanism midway of the stroke, and the force reaction on the teeth of the annular gear at the point of contact with the planet gear.

The operation of this form of my invention is similar to that of the form indicated in Figs. 8 to 14 inclusive, the difference being that in Figs. 8 to 14, the accelerator is mounted on the planet gear carriage and varies the relative positions of arms 57 and 57—A, whereas in Figs. 15 to 21 inclusive there are two accelerators mounted coaxial with the driving and driven shafts, and arms 85 and 85—A are keyed to the same shaft 83, and are 180 degrees apart. In either form of the invention the function of the accelerator is to compensate for the characteristic whereby maximum velocity would occur in such positions as Fig. 13 or Fig. 20 and to cause maximum and minimum velocities to occur at the positions indicated by Figs. 12, 14, 19 and 21, whereby the reversal of direction of force reactions does not cause a negative rotary reaction on the annular gear.

It will be apparent that the torque transmissions disclosed herein are reversible in that the driving shaft as shown may be employed as a driven shaft and the driven shaft shown may be employed as the driving shaft. The term "driven member" as used in the appended claims is a relative term and not intended to limit the element purely to being driven. Furthermore, it will be noted that driving may be caused by application of the driving force to the driving shafts as described or to any of the revolving members within the cage in any one of the three species shown, inasmuch as the driving torque only supplies make up energy when and as the driven member revolves and thereby transmits energy.

What I claim is:

1. In a torque transmission device, the combination of a rotary driven member, two revolvable masses, a mechanical movement connecting said masses so that the latter may accelerate and decelerate one another alternately and thereby alternately transfer kinetic energy from one to the other; said movement including a linkage providing a lever arm revolved from said masses and having spaced fulcrums at which the force reactions are exerted by said masses on said arm, a driving fulcrum on said arm eccentric to the axis of said driven member and connected thereto so as to react thereon to drive said driven member, said linkage having means located on said arm to reverse the direction of the force reactions at said driving fulcrum during a revolution of said arm; an accelerating mechanism comprising a first revolvable accelerator member, a second revolvable accelerator member, and means mutually connecting said accelerator member in such manner that revolution of either accelerator member imparts alternate accelerating and decelerating revolutionary motion to the other accelerator member, said accelerating mechanism being interconnected between said lever arm and the other of said masses.

2. In a torque transmission device, the combination of a driven member rotatable about a driven axis, two revolvable masses, a first crank arm mounted on said driven member to revolve about a first axis eccentric to said driven axis, a second crank arm mounted on said driven member to revolve about an axis eccentric to said driven axis and said first axis, said crank arms having interconnecting means whereby revolution of either crank arm imparts revolution to the other, means connecting one of said crank arms to one of said masses so as to be revolved therewith; and an accelerating mechanism comprising a first revolvable accelerator member, a second revolvable accelerator member, and means mutually connecting said accelerator members in such manner that revolution of either accelerator member imparts alternate accelerating and decelerating revolutionary motion to the other accelerator member, said accelerating mechanism being interconnected between the other of said crank arms and the other of said masses.

3. In a torque transmission device, the combination of a driven member rotatable about a driven axis, two revolvable masses, a first crank arm mounted on said driven member to revolve about a first axis eccentric to said driven axis, a second crank arm mounted on said driven member to revolve about an axis eccentric to said driven axis and said first axis, said crank arms having interconnecting means whereby revolution of either crank arm imparts revolution to the other: two accelerating mechanisms, one accelerating mechanism being interconnected between one of said crank arms and one of said masses, and the other accelerator mechanism being connected between the other of said crank arms and the other of said masses; each accelerating mechanism comprising a first revolvable accelerator member, a second revolvable accelerator member and means mutually connecting said accelerator members in such manner that revolution of either accelerator member imparts alternate accelerating and decelerating revolutionary motion to the other accelerator member.

4. In a torque transmission device, the combination of a driven member rotatable about a driven axis, two revolvable masses, a first crank arm mounted on said driven member to revolve about a first axis eccentric to said driven axis, a second crank arm mounted in said driven member to revolve about an axis eccentric to said driven axis and said first axis and positioned opposite to said first axis with respect to said driven axis said crank arms having interconnecting means whereby rotation of either crank arm imparts revolution to the other, means connecting one of said crank arms to one of said masses so as to be revolved therewith; and an accelerating mechanism comprising a first revolvable accelerator member, a second rotatable accelerator member, and means mutually connecting said accelerator members in such manner that revolution of either accelerator member imparts alternate accelerating and decelerating revolutionary motion to the other accelerator member, said accelerating mechanism being interconnected between the other of said crank arms and the other of said masses whereby said accelerating and decelerating motions are independent of any revolution of said mechanism about said driven axis.

5. In a torque transmission device, the combination of a driven member rotatable about a driven axis, two revolvable masses, a first crank arm mounted on said driven member to revolve about a first axis eccentric to said driven axis, a second crank arm mounted on said driven member to revolve about an axis eccentric to said driven axis and said first axis and positioned opposite to said first axis with respect to said driven axis, said crank arms having interconnecting means whereby revolution of either crank arm imparts revolution to the other: two accelerating mechanisms, one accelerating mechanism being interconnected between one of said crank arms and one of said masses, and the other accelerating mechanism being connected between the other of said crank arms and the other of said masses; each accelerating mechanism comprising a first revolvable accelerator member, a second revolvable accelerator member and means mutually connecting said accelerator members in such manner that revolution of either accelerator member imparts alternate accelerating and decelerating revolutionary motion to the other accelerator member, said accelerating mechanisms being so connected to said arms and masses that said accelerating and decelerating motions are independent of any revolutionary motions of said mechanisms about said driven axis.

6. In a torque transmission device, the combination of a driven member rotatable about a driven axis, two revolvable masses, a first crank arm mounted on said driven member to revolve about a first axis eccentric to said driven axis, a second crank arm mounted in said driven member to revolve about an axis eccentric to said driven axis and said first axis, fulcrum means connecting said crank arms providing a lever arm having a shiftable fulcrum and other fulcrums at the axes of said crank arms at which other fulcrums the bearing reactions of said crank arms from a force couple about the driven axis such that if one of said crank arms were continually driving the other the reaction on said shiftable fulcrum would periodically reverse its direction about the driven axis, means connecting one of said masses to one of said crank arms so as to be revolved therewith; and an accelerating mechanism comprising a first revolvable accelerator member, a second revolvable accelerator member, and means mutually connecting said accelerator members in such manner that revolution of either accelerator member imparts alternate accelerating and decelerating revolutionary motion to the other accelerator member, said accelerating mechanism being interconnected between the other of said crank arms and the other of said masses.

7. In a torque transmission device, the combination of a driven member rotatable about a driven axis, two revolvable masses, a first crank arm mounted on said driven member to revolve about a first axis eccentric to said driven axis, a second crank arm mounted in said driven member to revolve about an axis eccentric to said driven axis and said first axis, fulcrum means connecting said crank arms providing a lever arm having a shiftable fulcrum and other fulcrums at the axes of said crank arms at which other fulcrums the bearing reactions of said crank arms form a force couple about the driven axis such that if one of said crank arms were continually driving the other the reaction on said shiftable fulcrum would periodically reverse its direction about the driven axis; two accelerating mechanisms, one accelerating mechanism being interconnected between one of said crank arms and one of said masses, the other accelerating mechanism being connected between the other of said crank arms and the other of said masses; each accelerating mechanism comprising a first revolvable accelerator member, a second revolvable accelerator member, and means mutually connecting said accelerator members in such manner that revolution of either accelerator member imparts alternate accelerating and decelerating revolutionary motion to the other accelerator member, said accelerating mechanism being so connected to said arms and masses that said accelerating and decelerating motions are independent of any revolutionary motions of said mechanisms about said driven axis.

8. In a torque transmission device, the combination of a driven member having a cage rotatable about a driven axis, two revolvable masses, a first crank arm journalled in said cage to revolve about a first axis eccentric to said driven axis, a second crank arm journalled in said cage to revolve about an axis eccentric to said driven axis and said first axis, said crank arms having means interconnecting them whereby revolution of either crank arm imparts revolution to the other, means connecting one of said masses to one of said crank arms to be revolved therewith; a first accelerator arm journalled in said cage and having a trunnion therein, a disk rotatably mounted in said cage on an axis eccentric to said first axis, and a second accelerator arm journalled in said cage on an axis parallel with the axis of said first accelerator arm and having a trunnion, said disk having cam slots for travel therein of said trunnions in a direction to and from the axis of said disk.

9. In a torque transmission device, the combination of a driven member having a cage rotatable about a driven axis, two revolvable masses, a first crank arm journalled in said cage to revolve about a first axis eccentric to said driven axis, a second crank arm journalled in said cage to revolve about an axis eccentric to said driven axis and said first axis, said crank arms having means interconnecting them whereby revolution of either crank arm imparts revolution to the other; two accelerating mechanisms, each accelerating mechanism comprising a first accelerator arm journalled in said cage and having a trunnion thereon, a disk rotatably mounted in said cage on an axis eccentric to said first axis, and a second accelerator arm journalled in said cage on an axis parallel with the axis of said first accelerator arm and having a trunnion, said disk having cam slots for travel therein of said trunnions in a direction to and from the axis of said disk; one accelerator arm of an accelerating mechanism being connected to one mass and the other accelerator arm being connected to one of said crank arms, one accelerator arm of the other accelerating mechanism being connected to the other mass and the other accelerator arm being connected to the other crank arm.

10. In a torque transmission device, the combination of a rotary driven member, a first revolvable mass, a second revolvable mass, a circuitous rack secured to said driven member to be revolved therewith, a revolvable planetary gear meshed with said rack, a revolvable floating carriage journalling said planetary gear and maintaining the latter in mesh with said rack, a first crank arm secured to said planetary gear to be revolved thereby, a second crank arm journalled on an axis concentric with the axis of said first crank arm, means connecting one of said masses to one of said crank arms whereby revolution of either the last mentioned crank arm or the last mentioned mass imparts revolution to the other; an accelerating mechanism mounted in said carriage comprising a first revolvable accelerator member, a second revolvable accelerator member, and means mutually connecting said accelerator members in such manner that revolution of either accelerator member imparts alternate accelerating and decelerating revolutionary motion to the other accelerator member, said accelerating mechanism having one of said accelerator members secured to said planetary gear to be revolved thereby and the other accelerator member connected to said second mass.

11. In a torque transmission device, the combination of a rotary driven member, a first revolvable mass, a second revolvable mass, a rotatable floating cage secured to said driven member, a circuitous rack secured to said cage to be revolved therewith, a revolvable planetary gear meshed with said rack, a revolvable floating carriage journalling said planetary gear and maintaining the latter in mesh with said rack, a first crank arm secured to said planetary gear to be revolved thereby, a second crank arm journalled on an axis concentric with the axis of said first crank arm, means connecting one of said masses to one of said crank arms whereby revolution of either the last mentioned crank arm or the last mentioned mass imparts revolution to the other; an accelerating mechanism comprising a first accelerator arm journalled in said carriage and having a trunnion thereon, a disk rotatably mounted in said carriage, and a second accelerator arm journalled in said carriage on an axis parallel with the axis of said first accelerator arm and having a trunnion, said disk having cam slots for travel therein of said trunnions in a direction to and from the axis of said disk, one of said accelerator arms being secured to said planetary gear to be revolved thereby and the other accelerator arm being connected to said second mass.

12. In a torque transmission device, the combination of a rotary driven member, a first revolvable mass, a second revolvable mass, a circuitous rack secured to said driven member to be revolved therewith, a revolvable planetary gear meshed with said rack, a revolvable floating carriage journalling said planetary gear and maintaining the latter in mesh with said rack, a first crank arm secured to said planetary gear to be revolved thereby, a second crank arm secured to said planetary gear to be revolved thereby, means connecting said first mass to said first crank arm whereby revolution of either said first crank arm or said first mass imparts revolution to the other, means connecting one of said members to said first mass for rotation therewith; an accelerating mechanism mounted in said carriage comprising a revolvable accelerator member, means mutually connecting said second crank arm and said accelerator member in such manner that revolution of either said accelerator member or said second crank arm imparts alternate accelerating and decelerating revolutionary motion to the other, and a third crank arm secured to said accelerator member, said third crank arm being connected to said second mass to revolve the latter.

13. In a torque transmission device, the combination of a rotary driven member, a first revolvable mass, a second revolvable mass, a circuitous rack secured to said driven member to be revolved therewith, a revolvable planetary gear meshed with said rack, a revolvable floating carriage journalling said planetary gear and maintaining the latter in mesh with said rack, a first crank arm secured to said planetary gear to be revolved thereby, a second crank arm secured to said planetary gear to be revolved thereby and having a trunnion, means connecting said first mass to said first crank arm whereby revolution of either said first crank arm or said first mass imparts revolution to the other, means connecting one of said members to said first mass for rotation therewith; an accelerating mechanism mounted in said carriage having cam slots in which said trunnions travel to and from the axis of said disk so that revolution of either said accelerator arm or said second crank arm imparts alternate accelerating and decelerating revolutionary motion to the other, and a third crank arm secured to said accelerator arm, said third crank arm being connected to said second mass to revolve the latter.

14. In a torque transmission device, the combination of a rotary driven member, a first revolvable mass, a second revolvable mass, a circuitous rack secured to said driven member to be revolved therewith, a revolvable planetary gear and maintaining the latter in mesh with said rack, a first crank arm secured to said planetary gear to be revolved thereby, means connecting one of said masses to one of said crank arms whereby revolution of either the last mentioned crank arm or the last mentioned mass imparts revolution to the other, means connecting one of said members to said first mass for driving the latter; an accelerating mechanism comprising a first revolvable accelerator arm, a second revolvable accelerator arm, and means mutually connecting said accelerator arms in such manner that revolution of either accelerator arm imparts alternate accelerating and decelerating revolutionary motion to the other accelerator arm, said accelerating mechanism being mounted in said carriage with one of said accelerator arms being secured to the other of said crank arms to be revolved thereby and the other accelerator arm being connected to said second mass.

15. In a torque transmission device, the combination of a rotary driven member, a first revolvable mass, a second revolvable mass, a circuitous rack secured to said driven member to be revolved therewith, a revolvable planetary gear meshed with said rack, a revolvable floating carriage journalling said planetary gear and maintaining the latter in mesh with said rack, a first crank arm secured to said planetary gear to be revolved thereby, a second crank arm secured to said planetary gear to be revolved thereby, means connecting one of said masses to one of said crank arms whereby revolution of either the last mentioned crank arm or the last mentioned mass imparts revolution to the other, means connecting one of said members to said first mass for driving the latter; an accelerating mechanism mounted in said carriage comprising a first revolvable accelerator arm secured to the other of said crank arms to be revolved thereby, a second revolvable accelerator arm connected to said second mass, said accelerator arms having trunnions, and a disk journalled in said carriage and provided with cam slots in which said trunnions may travel to and from the axis of said disk.

16. In a torque transmission device, the combination of a rotary driven member, a first revolvable mass, a second revolvable mass, a circuitous rack secured to said driven member to be revolved therewith, a revolvable planetary gear meshed with said rack, a revolvable floating carriage journalling said planetary gear and maintaining the latter in mesh with said rack, a first crank arm secured to said planetary gear to be revolved thereby, a second crank arm secured to said planetary gear to be revolved thereby; an accelerating mechanism mounted in said carriage comprising a first revolvable accelerator arm secured to the one of said crank arms to be revolved thereby and a second revolvable accelerator arm connected to said first mass, said first and second accelerator arms having trunnions, a first disk journalled in said carriage and provided with cam slots in which the trunnions on said first and second accelerator arms may travel to and from the axis of said disk; a second accelerating mechanism mounted in said carriage comprising a third revolvable accelerator arm secured to the other of said crank arms to be revolved thereby and a fourth revolvable accelerator arm connected to said second mass, said third and fourth accelerator arms having trunnions and a second disk journalled in said carriage and provided with cam slots in which the said trunnions on said third and fourth accelerator arms may travel to and from the axis of said second disk.

17. In a torque transmission device, the combination of a rotary driven member, two revolvable masses, a mechanical movement connecting said masses so that the latter may accelerate and decelerate one another alternately and thereby alternately transfer kinetic energy from one to the other, said movement including lever means revolved from said masses and by which force reactions are exerted from the masses to said lever means, a driving fulcrum on said lever means eccentric to the axis of said driven member and connected thereto so as to react thereon to drive said driven member unidirectionally, said lever means embodying means to reverse the direction of the force reactions at said driving fulcrum during a cycle of operation of said lever means.

18. In a torque transmission device, the combination of a rotary driven member, two revolvable masses, a mechanical movement connecting said masses so that the latter may accelerate and decelerate one another alternately and thereby alternately transfer kinetic energy from one to the other, said movement including lever means revolved from said masses and by which force reactions are exerted from the masses to said lever means, a driving fulcrum on said lever means eccentric to the axis of said driven member and connected thereto so as to react thereon to drive said driven member unidirectionally, said lever means embodying means to reverse the direction of the force reactions at said driving fulcrum during a cycle of operation of said lever means, and an accelerating mechanism comprising a first revolvable accelerating member, a second revolvable accelerating member, and means mutually connecting said accelerating members in such manner that revolution of either accelerating member imparts alternate accelerating and decelerating revolutionary motion to the other accelerating member, said accelerating mechanism being interconnected between said lever means and the other of said masses.

19. A torque transmission device comprising a rotary driven member, an annular gear element mounted concentrically on said rotary driven member, a planetary gear element in driving relationship to said annular gear element, a rotatable member journalling said planetary gear element and maintaining the annular element and the planetary element in constant driving relationship to each other, lever arms connected to said planetary member in a manner as to insure that revolution of said lever arms will produce revolution of the planetary member, a first revolvable mass, a second revolvable mass, means creating a differential engagement of said lever members with said revolvable masses in a manner to insure that revolution of either of said masses will produce alternate accelerating and decelerating revolutionary motion in the other of said masses through said lever members thereby reacting torsionally unidirectionally on said rotary driven member through said annular gear element, and driving means imparting revolutionary motion to said masses and said lever members.

20. A torque mechanism comprising a rotary driven member, an annular gear mounted concentrically thereon, a gear in mesh therewith and mounted eccentrically thereto, a rotatable member journalling said eccentrically disposed gear and maintaining it in driving relationship to the concentrically disposed annular gear, a lever arm affixed to said eccentrically disposed gear, a first revolvable mass, a second revolvable mass, means producing differential engagement between the lever arm and the first and second revolvable masses whereby revolution of either revolvable mass will produce alternate accelerating and decelerating revolutionary motion in the other revolvable mass through said lever arm reacting unidirectionally on the concentrically disposed gear through said eccentrically disposed gear.

21. A torque transmission device comprising a drive shaft, a driven shaft, a first revolvable mass, a driven member affixed to the driven shaft, a second revolvable mass rotatably supported by the driven member, force reactive means operatively interposed between said masses whereby revolution of either of said revolvable masses will produce alternate accelerating and decelerating revolutionary motion of the other of said masses through said force reactive means to impart unidirectional torsional motion to said driven member and the driven shaft, rotatably connective means between said drive shaft and said masses.

22. A torque transmission device comprising a drive shaft, a driven shaft, a first revolvable mass, a driven member affixed to the driven shaft, a second revolvable mass rotatably supported by the driven member, force reactive means operatively interposed between said masses whereby revolution of either of said revolvable masses will produce alternate accelerating and decelerating revolutionary motion of the other of said masses through said force reactive means to impart unidirectional torsional motion to said driven member and the driven shaft, and accelerating means interposed between said reactive means and said revolvable masses whereby an additional accelerating and decelerating action will be imposed alternately upon the reactive means during certain phases of the cycle of operation of said reactive means, rotatably connective means between said drive shaft and said masses.

23. A torque transmission device comprising a rotary driven member, a circuitous rack mounted on said rotary driven member, a planetary gear meshed with said rack, a rotatable member journalling said planetary gear and maintaining said gear in mesh with said rack, arm members connected to said planetary gear in such manner that revolution of said arm members produce revolution of said planetary gear, a first revolvable mass, a second revolvable mass, sliding contact surfaces mounted on said arm members meshed with sliding contact surfaces mounted on said revolvable masses in such manner that revolution of either of said masses produces alternate accelerating and decelerating revolutionary motion in the other of said masses through said arm members thereby reacting torsionally on said rotary driven member through said circuitous rack, driving means connected to said masses and said arm members.

24. A torque transmission device comprising a rotary driven member, a circuitous rack mounted on said rotary driven member, a planetary gear meshed with said rack, rotatable means maintaining said planetary gear in mesh with said rack, an arm member mounted on said planetary gear revolvable therewith, a first revolvable member, a second revolvable member, sliding contact surfaces mounted on said arm member, sliding contact surfaces mounted on said first and second revolvable members whereby revolution of either revolvable member produces alternate accelerating and decelerating revolutionary motion in the other revolvable member through said arm member and said planetary gear reacting on said circuitous rack, a first revolvable mass, means connecting said mass revolvably to said first revolvable member, a second revolvable mass, means connecting said mass revolvably to said second revolvable member, revolvable driving means producing revolution of said masses and revolvable members.

25. In a torque transmission device the combination of a driven member rotatable about a driven axis, an internal gear mounted on said driven member circuitous about said driven axis, a planetary gear meshed with said internal gear, means for journalling said planetary gear permitting rotation of said gear and revolution about said internal gear and maintaining said planetary gear in mesh with said internal gear, an arm member mounted on said planetary gear having sliding contact surfaces disposed opposite to each other with respect to the axis of said planetary gear, revolvable members having sliding contact surfaces meshed respectively with opposed sliding contact surfaces on said arm member whereby revolution of said planetary gear and arm member about said internal gear produces revolution of said revolvable members in such manner that one of said members accelerates at the same time that the other of said members decelerate thereby reacting torsionally on said driven member through the point of tooth contact between said planet gear and said internal gear, revolvable masses connected revolvably to each of said revolvable members, and revolvable driving means producing revolution of said masses, revolvable members, arm member and planetary gear.

26. A torque transmission device comprising a driven member rotatable about a driven axis, a first revolvable member axised in said driven member eccentric to said driven axis, a first revolvable mass, means connecting said first revolvable mass to said first revolvable member whereby revolution of either produces revolution of the other, a second revolvable member axised in said driven member eccentric to said axis of said first revolvable member, a second revolvable mass, means connecting said second revolvable mass to said second revolvable member whereby revolution of either produces revolution of the other, sliding contact surfaces mounted on each of said revolvable members meshed in such a manner that revolution of said first revolvable mass and said first revolvable member produces alternately accelerating and decelerating revolutionary motion in said second revolvable member and said second revolvable mass, thereby reacting torsionally on said driven member through the axes of said revolvable members, and driving means imparting revolutionary motion to said members and masses.

27. A torque transmission device comprising a driven member rotatable about a driven axis, a first revolvable member axised in said driven member eccentric to said driven axis, a first revolvable mass rotatably connected to said first revolvable member, a second revolvable member axised in said driven member eccentric to said driven axis, a second revolvable mass rotatably connected to said first revolvable member, gear elements mounted on said first and said second revolvable members intermeshing in such manner that revolution of said first mass and said first revolvable member produces alternately accelerating and decelerating revolutionary motion in said second revolvable member and said second mass, and driving means producing revolution of said masses and members.

ROBERT V. DERRAH.